United States Patent

Bobeck et al.

[15] 3,646,529

[45] Feb. 29, 1972

[54] MAGNETIC DEVICES UTILIZING GARNET COMPOSITIONS

[72] Inventors: Andrew Henry Bobeck, Chatham; David Herbert Smith, Lebanon Township, Hunterdon County; Edward Guerrant Spencer, Murray Hill; LeGrand Gerard Van Uitert, Morris Township, Morris County, all of N.J.

[73] Assignee: Bell Telephone Laboratories, Incorporated, Murray Hill, Berkeley Heights, N.J.

[22] Filed: Apr. 20, 1970

[21] Appl. No.: 30,071

[52] U.S. Cl. ..................340/174 TF, 340/174 SR, 252/62.57

[51] Int. Cl. ..................................G11c 19/00, G11c 11/14

[58] Field of Search ..........................340/174 TF; 252/62.57

[56] References Cited

UNITED STATES PATENTS

| | | | |
|---|---|---|---|
| 3,444,084 | 5/1969 | Geller et al. | 252/62.57 |
| 3,132,105 | 5/1964 | Harrison et al. | 252/62.57 |
| 3,193,502 | 7/1965 | Schieber | 252/62.57 |
| 3,291,740 | 12/1966 | Espinosa et al. | 252/62.57 X |

*Primary Examiner*—Stanley M. Urynowicz, Jr.
*Attorney*—R. J. Guenther and Edwin B. Cave

[57] ABSTRACT

Magnetic crystalline materials of the garnet structure with suitable magnetic moments and with reduced temperature dependence of magnetic moment are advantageously incorporated in devices depending for their operation on "bubble" domains.

10 Claims, 3 Drawing Figures

INVENTORS: A.H. BOBECK
D.H. SMITH
E.G. SPENCER
L.G. VAN UITERT
BY George S. Indig
ATTORNEY

MAGNETIC DEVICES UTILIZING GARNET COMPOSITIONS

BACKGROUND OF THE INVENTION

1. Field of the Invention

The invention is concerned with magnetic "bubble" devices. Such devices, which depend for their operation on the nucleation and/or propagation of small enclosed magnetic domains of polarization opposite to that of the immediately surrounding material, may perform a variety of functions including switching, memory logic, etc.

2. Description of the Prior Art

The last two years has seen significant interest develop in a class of magnetic devices known generically as "bubble" domain devices. Such devices described, for example, in IEEE Transactions Mag-5 (1969) pp. 544–553 are generally planar in configuration and are constructed of materials which have magnetically easy directions essentially perpendicular to the plane of the structure. Magnetic properties, e.g., magnetization, anisotropy, coercivity, mobility, are such that the device may be maintained magnetically saturated with magnetization in a direction out of the plane and that small localized regions of polarization aligned opposite to the general polarization direction may be supported. Such localized regions, which are generally cylindrical in configuration, represent memory bits. Interest in devices of this nature is, in large part, based on high bit density. Such densities, which are expected to reach $10^5$ bits or more per square inch of wafer, are, in turn, dependent on the ability of the material to support such localized regions of sufficiently small dimension.

In a particular design directed, for example, to a $10^6$ bit memory, bubble domains of the order of one-third mil in diameter are contemplated. A $10^5$ bit memory may be based on stable domains three times greater, and a $10^7$ bit memory requires stable bubble domains three times smaller.

To date, one of the more significant obstacles to commercial realization of such devices has been the material limitation. The first problem has been a practical one, i.e., growth of sufficiently large crystals which are sufficiently defect free, shown physical and chemical stability, etc. An equally significant problem is more fundamental. Materials of requisite uniaxial anisotropy have generally been lacking in some aspect. For example, reported operating devices have generally been based on rare earth orthoferrites. While it is quite likely that orthoferrite bubble devices will go into commercial use, usual orthoferrites compositions present an obstacle to development of high bit density design.

In general, orthoferrites are of such magnetic characteristics as to make difficult the support of bubble domains smaller than about 2 mils in diameter. In usual design, this implies a maximum bit density of the order of $10^5$ bits per square inch.

Attempts to reduce stable domain size at usual operating temperatures have posed fresh problems, e.g., operation near the magnetic reorientation temperature reduces bubble size but results in high magnetostriction, thereby complicating both fabrication and operation. Operation near the reorientation temperature also implies a large temperature dependence of bubble size in turn requiring close temperature control of devices utilizing such compositions. Further, despite emphasis of growth techniques for orthoferrites, materials to date have not been of sufficient crystalline perfection to permit expedient commercial fabrication.

A second class of materials that has received some attention for use in bubble devices is the hexagonal ferrite (e.g., the magnetoplumbites). Magnetic characteristics of these materials are such as to permit support of exceeding small bubble domains. In fact, the problem has been the reverse of that for the orthoferrites and composition modifications have often been in a direction such as to increase rather than decrease bubble size.

At this time, magnetoplumbites are not considered to be very promising bubble materials, largely because of another limitation, i.e., low mobility. This term refers to the speed with which a bubble may be propagated within the material for a given applied field. Since most devices rely on bubble movement for the performance of the various design functions, low mobility is considered a significant hindrance.

Several approaches have been taken to improve mobility in hexagonal ferrites and various of these have met with some degree of success. While it is possible that such materials with appropriate device characteristics will evolve, the quest continues for classes of materials that have no such inherent limitations.

The past decade has seen substantial device interest in a third class of magnetic materials. These materials, first announced in 1956 (see *Compte Rendue*, Vol. 242, p. 382) are insulating ferrimagnets of the garnet structure. The best known composition is yttrium iron garnet, $Y_3Fe_5O_{12}$, sometimes referred to simply as YIG. Compositional variations are many and include complete or partial substitution by various of the 4*f* rare earths for yttrium, partial substitution of aluminum or gallium for iron, and others. Growth habits of these materials are well understood and many techniques exist for producing large crystals of high perfection.

X-ray studies and fundamental structural considerations have always indicated the magnetic garnets to be magnetically isotropic. From this standpoint garnets have not been natural candidates for bubble devices which require uniaxial magnetic anisotropy. However, virtually from their inception, workers concerned with the garnets have observed regions of magnetic anisotropy. In general, little attention has been paid to such anisotropy and literature references to this phenomenon generally invoke a bulk strain mechanism. On some occasions, the anisotropy has been attributed to surface strain due, for example, to grinding and/or polishing.

Frustrations growing out of the inadequacies of the orthoferrites and hexagonal ferrites have prompted study of the magnetic garnets for use in magnetic devices.

A difficulty in the use of simple garnet compositions in bubble devices arises from the relationship:

$$B\ E^{1/2}K_u^{1/2}M^{-2}$$

in which B = bubble diameter, E = magnetic exchange energy, $K_u$ = uniaxial magnetocrystalline anisotropy and M = magnetic moment in compatible units. Many otherwise suitable garnet compositions have magnetic moments which are inappropriate for such device use. In general, it is desired that such moment lie within the range of from about 30 gauss to about 500 gauss, for bubble diameters of the order of from 0.01 mil to about 10 mils for many garnet compositions. On the other hand, simple garnets often have moments significantly higher so that, for example, the room temperature moment for YIG is approximately 1,770 gauss.

It is well known that magnetic moment may be reduced by a variety of partial substitutions either in iron sites or in the dodecahedral site. It is well known, for example, that partial substitution of gallium, aluminum, silicon or germanium reduces moment by diluting the iron in the dominant tetrahedral sites. It is well known also that use of, for example, gadolinium in the dodecahedral site reduces moment at room temperature as it aligns its moment in opposition to the prevailing tetrahedral ion field.

Unfortunately, while the temperature dependence of magnetic moment is sufficiently insensitive to temperature change for many simple garnet compositions, this is generally not true of compositions which have been modified in order to reduce moment.

In consequence, use of such modified garnet compositions in bubble devices requires very close temperature control. This requirement often eliminates these compositions as practical candidates.

SUMMARY OF THE INVENTION

In accordance with the invention there are described garnet compositions having magnetic moments generally within the range of from about 30 gauss to about 500 gauss and which are further modified by partial substitutions so as to reduce the dependence of such moment on temperature.

In general, the compositions contemplated in accordance with the invention require substitutions in the tetrahedral site and at least one R-ion from the set Eu, Gd, Tb, Dy, Ho, Er and Tm in the dodecahedral sites.

The inventive teaching generally contemplates operation at room temperature although prescribed compositions are generally useful over a range including temperatures of from about −30° to +130° F. (−34° to +54° C.). To achieve temperature insensitivity within the prescribed magnetization range it is necessary to substitute a nonmagnetic ion in part for tetrahedral iron while at the same time including at least one ion of the above R-ion set in the dodecahedral site. In a preferred grouping there is at least one R-ion from the subset Gd, Tb and Dy.

The primary consideration giving rise to the inventive concept is the desire to retain bubble size stable. For many device purposes this gives rise to the requirement that bubble size varies no more than +20 percent over an expected operating temperature range. Assuming a limited temperature variation of from about 10° C. to about 50° C. this implies a maximum tolerable change in magnetization of 10 percent within this temperature range.

As developed in the detailed description the above is a simplifying assumption in that other parameters upon which bubble size is dependent may also vary with temperature and in that other temperature ranges may be of concern.

DETAILED DESCRIPTION

1. The Figures

Figure 1:
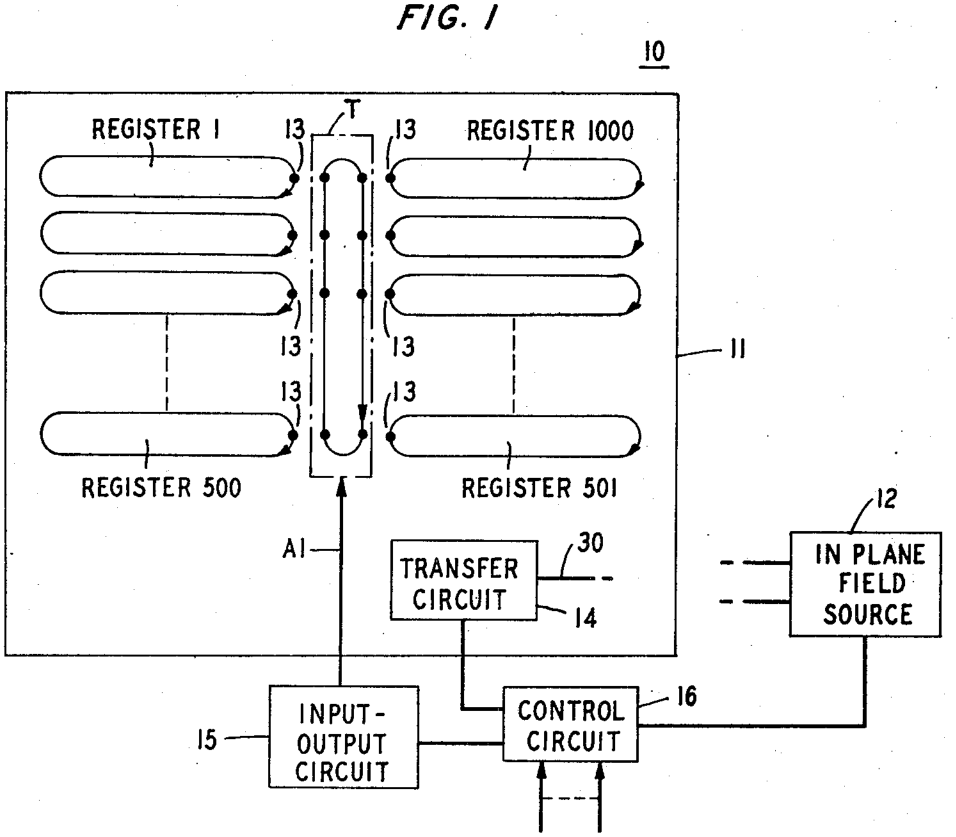
FIGS. 1 and 2 are a schematic representation and plan view, respectively, of a magnetic device utilizing a composition in accordance with the invention, and FIG. 3 on coordinates of $4\pi M$ in gauss and temperature in degrees Kelvin is a plot containing curves showing the interdependence of these two parameters for series of five compositions one of which is within the inventive scope.
Figure 2:
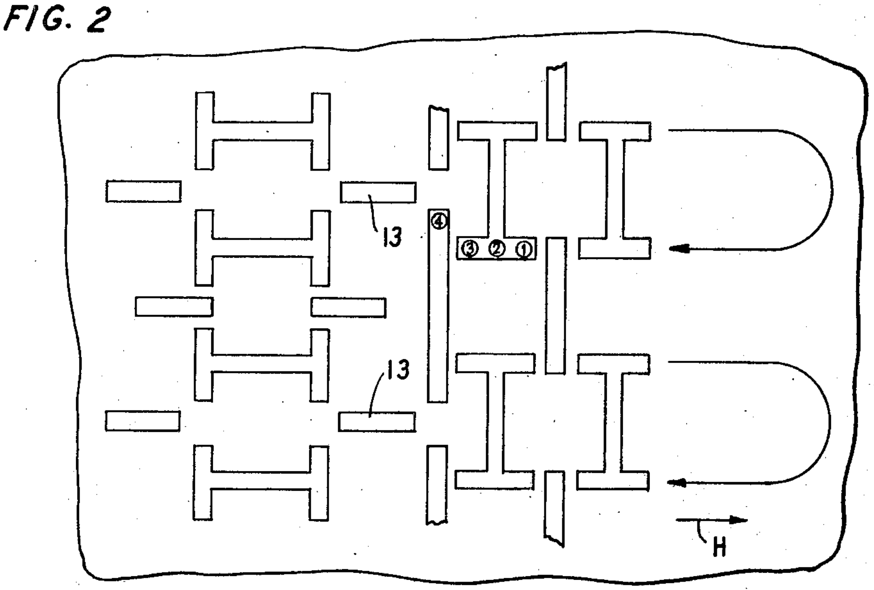

The device of FIGS. 1 and 2 is illustrative of the class of "-bubble" devices described in *IEEE Transactions on Magnetics* Vol. MAG-5 No. 3 Sept. 1969 pp. 544–553 in which switching, memory and logic functions depend upon the nucleation and propagation of enclosed, generally cylindrically shaped, magnetic domains having a polarization opposite to that of the immediately surrounding area. Interest in such devices centers, in large part, on the very high packing density so afforded, and it is expected that commercial devices with from $10^5$ to $10^7$ bit positions per square inch will be commercially available. The device of FIGS. 1 and 2 represents a somewhat advanced stage of development of the bubble devices and includes some details which have been utilized in recently operated devices.

FIG. 1 shows an arrangement 10 including a sheet or slice 11 of material in which single wall domains can be moved. The movement of domains, in accordance with this invention, is dictated by patterns of magnetically soft overlay material in response to reorienting in-plane fields. For purposes of description, the overlays are bar and T-shaped segments, and the reorienting in-plane field rotates clockwise in the plane of sheet 11 as viewed in FIGS. 1 and 2. The reorienting field source is represented by a block 12 in FIG. 1 and may comprise mutually orthogonal coil pairs (not shown) driven in quadrature as is well understood. The overlay configuration is not shown in detail in FIG. 1. Rather, only closed "information" loops are shown in order to permit a simplified explanation of the basic organization, in accordance with this invention. Implementation is described further on.

The figure shows a number of horizontal closed loops separated into right and left banks by a vertical closed loop as viewed. It is helpful to visualize information, i.e., domain patterns, circulating clockwise in each loop as an in-plane field rotates clockwise. This operation is consistent with that disclosed in the aforementioned application of A. H. Bobeck and is explained in more detail hereinafter.

The movement of domain patterns simultaneously in all the registers represented by loops in FIG. 1 is synchronized by the in-plane field. To be specific, attention is directed to a location identified by the numeral 13 for each register in FIG. 1. Each rotation of the in-plane field advances a next consecutive bit (presence or absence of a domain) to that location in each register. Also, the movement of bits in the vertical channel is synchronized with this movement.

In normal operation, the horizontal channels are occupied by domain patterns and the vertical channel is unoccupied. A binary word comprises a domain pattern which occupies simultaneously all the positions 13 in one or both banks, depending on the specific organization, at a given instance. It may be appreciated that a binary word, so represented, is fortunately situated for transfer into the vertical loop.

Transfer of a domain pattern to the vertical loop, of course, is precisely the function carried out initially for either a read or a write operation. The fact that information is always moving in a synchronized fashion permits parallel transfer of a selected word to the vertical channel by the simple expedient of tracking the number of rotations of the in-plane field and accomplishing parallel transfer of the selected word during the proper rotation.

The locus of the transfer function is indicated in FIG. 1 by the broken loop T encompassing the vertical channel. The operation results in the transfer of a domain pattern from (one or) both banks of registers into the vertical channel. A specific example of an information transfer of a one-thousand-bit word necessitates transfer from both banks. Transfer is under the control of a transfer circuit represented by block 14 in FIG. 1. The transfer circuit may be taken to include a shift register tracking circuit for controlling the transfer of a selected word from memory. The shift register, of course, may be defined in material 11.

Once transferred, information moves in the vertical channel to a read-write position represented by vertical arrow A1 connected to a read-write circuit represented by clock 15 in FIG. 1. This movement occurs in response to consecutive rotations of the in-plane field synchronously with the clockwise movement of information in the parallel channels. A read or a write operation is responsive to signals under the control of control circuit 16 of FIG. 1 and is discussed in some detail below.

The termination of either a write or a read operation similarly terminates in the transfer of a pattern of domains to the horizontal channel. Either operation necessitates the recirculation of information in the vertical loop to positions 13 where a transfer operation moves the pattern from the vertical channel back into appropriate horizontal channels as described above. Once again, the information movement is always synchronized by the rotating field so that when transfer is carried out appropriate vacancies are available in the horizontal channels at positions 13 of FIG. 1 to accept information.

For simplicity, the movement of only a single domain, representing a binary one, from a horizontal channel into the vertical channel is illustrated. The operation for all the channels is the same as is the movement of the absence of a domain representing a binary 0. FIG. 2 shows a portion of an overlay pattern defining a representative horizontal channel in which a domain is moved. In particular, the location 13 at which domain transfer occurs is noted.

The overlay pattern can be seen to contain repetitive segments. When the field is aligned with the long dimension of an overlay segment, it induces poles in the end portions of that segment. We will assume that the field is initially in an orientation as indicated by the arrow H in FIG. 2 and that positive poles attract domains. One cycle of the field may be thought of as comprising four phases and can be seen to move a domain consecutively to the positions designated by the encircled numerals 1, 2, 3 and 4 in FIG. 2, those positions being occupied by positive poles consecutively as the rotating field comes into alignment therewith. Of course, domain patterns in the channels correspond to the repeat pattern of the overlay. That is to say, next adjacent bits are spaced one repeat pattern apart. Entire domain patterns representing consecutive binary words, accordingly, move consecutively to positions 13.

The particular starting position of FIG. 2 was chosen to avoid a description of normal domain propagation in response to rotating in-plane fields. That operation is described in detail in the above-mentioned reference publication. Instead, the consecutive positions from the right, as viewed in FIG. 1, for a domain adjacent the vertical channel preparatory to a transfer operation are described. A domain in position 4 of FIG. 2 is ready to begin its transfer cycle.

Figure 3:
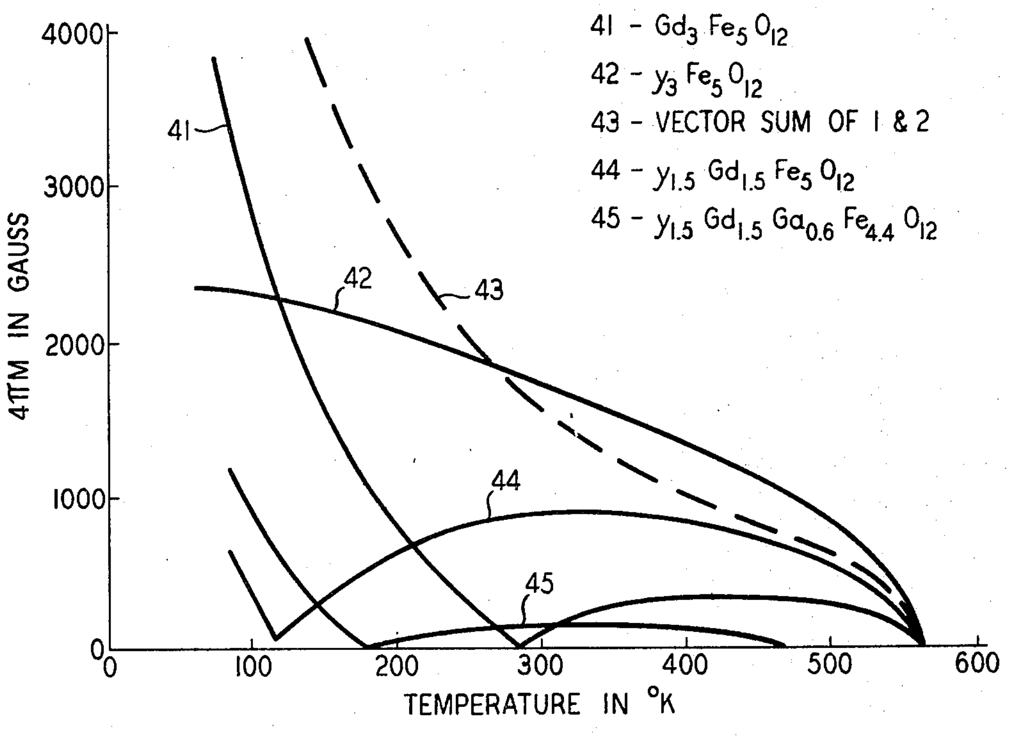

FIG. 3 is illustrative of the information serving both as the background to and the result of the inventive concept.

Referring now to FIG. 3 curve 41 is illustrative of the temperature dependence of a prior art composition whose moment has been lowered by use of a magnetic dodecahedral site ion. It is generally recognized that this composition, $Gd_3Fe_5O_{12}$, has a low moment near room temperature. It is seen that the low moment is related to a magnetic compensation point which occurs at about 286° K. Unfortunately, this compensation point is sufficiently close to room temperature and temperature dependence is of such large magnitude near the compensation point that this material is generally unacceptable for use in magnetic devices in which magnetization is to be kept within prescribed narrow limits. Curve 42 shows the relationship for the usual YIG composition ($Y_3Fe_5O_{12}$). It is seen that while the moment of this prototypical material does not pass through a compensation point it nevertheless has a significant temperature dependence. In any event this material is not useful in the usual bubble device since the magnetization is far too high.

Curve 43 is the vector sum of curves 41 and 42. Since the effect of the vector summation is the elimination of the contribution of the ions in the tetrahedral and octahedral sites, the result is to show the contribution of gadolinium alone. Curve 44 is representative of the composition $Y_{1.5}Gd_{1.5}Fe_5O_{12}$. It is seen that the temperature coefficient in the region of room temperature is lowered significantly by decreasing the temperature at which the compensation point occurs (in this instance to about 120° K). The magnetization has been significantly increased relative to that of the composition of curve 41. However, the moment, $4\pi M$, which at room temperature is close to 1,000 gauss is too high for many device uses. While it is possible to reduce the moment for a composition containing both of these cations by use of lesser amounts of yttrium, such modification has a lesser effect on the compensation point and, therefore, does not sufficiently reduce temperature dependence. Curve 45 shows the relationship for a composition of the invention, in this instance $Y_{1.5}Gd_{1.5}Ga_{0.6}Fe_{4.4}O_{12}$. It is seen that the moment in region of room temperature is about 150 gauss, while the magnetization excursion over the critical temperature range is less than 15 gauss.

2. Compositional Considerations

From the standpoint of the invention there are two fundamental requirements relating to magnetic problems: (1) moment must be within a tolerable range to produce appropriate bubble dimensions (the broad range of from about 30 gauss to about 500 gauss has been indicated; a preferred range is from about 70 gauss to about 300 gauss) and (2) this property as well as other magnetic parameters affecting bubble size should be reasonably insensitive to temperature change.

Tolerable temperature dependence is in turn related to device design and expected operating conditions. Extreme operating conditions, for example, for use in unheated buildings or outdoors particularly in inland areas may result in a temperature range of from about −30° F. to about +130° F. Critical device design contemplates an allotted spacing between bubbles no greater than that of the bubble diameter. Under these circumstances bubble diameter should vary no more than +20 percent. It has been generally observed that compositional design resulting in the desired insensitivity of magnetic moment on temperature results also in sufficient insensitivity of other magnetic parameters entering into bubble size such that these other parameters may safely be ignored.

The foregoing and related considerations result in an overall tolerable magnetization excursion of about 25 percent. This is a broad tolerable limit. A preferred limit is about 10 percent variation in magnetization. From the equation it is seen that a 10 percent variation in magnetization is attended by a 20 percent change in bubble diameter (assuming little contribution by other magnetic parameters). This preferred limit is suitable for the critical device design providing for spacings approximately equal to a bubble domain diameter.

Temperature dependence is expressed in terms of overall temperature excursion. This is not readily converted into units of permitted change per degree since, particularly for broad temperature range of operation, it is possible to utilize turnover points in the temperature dependence characteristic. For example, in FIG. 3 the composition of curve 45 has a temperature turnover at about room temperature so that the maximum temperature excursion properly selected is less than one-half that of the product of the change per degree and the temperature range.

All of the foregoing considerations give rise to two fundamental requirements. It is always assumed that compositions containing five iron ions per formula unit have too high a magnetization for the desired range of bubble diameter. (The exceptions are garnets of gadolinium, terbium and dysprosium, all of which have magnetizations which are strongly dependent on temperature.) In such compositions the iron ions in the tetrahedral sites prevail and magnetic moment for the inventive compositions is reduced to a desired range by diluting the iron in these sites. Nonmagnetic ions which preferentially enter the tetrahedral sites have ionic radii of 0.62 A. or smaller. Primary examples are $Ga^{3+}$, $Al^{3+}$, $Si^{4+}$, $Ge^{4+}$ and $V^{5+}$. (It is well known that use of other than trivalent ions requires charge compensation—it is known that this may be accomplished by use of divalent or monovalent ions in any of the cation sites.)

The invention is generally based on the assumption of operation at or near room temperature. Based on this assumption tetrahedral site substitution regardless of the nature of the diluent is from about 0.3 to about 1.3 per formula unit. The maximum of 1.3 applies since many diluents while preferentially occupying tetrahedral sites do enter octahedral sites to a lesser extent. A preferred maximum is about 0.95 since this necessarily results in retention of tetrahedral predominance even for ions which do not enter octahedral sites. (There are three tetrahedral sites per formula unit). The magnetization resulting from such dilution is not independent of other compositional variations at least one of which is also a requirement of the invention. However, for most suitable substitutions in other sites this dilution range in the tetrahedral site is sufficient to permit attainment of the desired broad magnetization range of from about 30 gauss to about 500 gauss.

Understanding of garnet compositions is at a highly sophisticated level. It is to be understood that the foregoing is merely illustrative in many respects. For example other ions may replace iron to reduce moment.

COMPOSITIONAL REQUIREMENT I (A) Gd, Tb, DY, Ho, Eu, Er

The first requirement of the invention is the reduction of the magnetic moment due to iron in tetrahedral sites as discussed above.

COMPOSITIONAL REQUIREMENT II

The second requirement of the invention concerns the dodecahedral site. A formula unit contains three such sites. These sites are ordinarily occupied by yttrium, lanthanum, and the 4*f* rare earth ions. These may be divided into the strong to moderately magnetic group (A) Gdr, Tb, Dy, Ho, Eu, or and Tm and the nonweak or oppositely aligned magnetic group (B) Y, La, Ce, Pr, Nd, Sm, Yb and Lu. The effect of the magnetic group (B) ions is similar to that of nonmagnetic ions since their magnetic contribution in opposition to that of tetrahedral iron is relatively small or nonexistent. In the prototypical composition, YIG, the dodecahedral site, is occupied by a nonmagnetic ion. This ion $Y^{3+}$ may be replaced by Lu $3^+$ or in part by $La^{3+}$ with no significant change in magnetic properties. It is a requirement of the invention that the dodecahedral site be at least partially occupied by a magnetic rare earth ion whose overall (spin + orbital) moment is aligned opposite to that of tetrahedral iron and is of sufficient magnitude to produce an appreciable reduction in M at room temperature; these trivalent ions of the 4*f* rare earth are given as group (A) which includes elements (Nos. 63 through 69 on the periodic table). The effect of such occupancy is to produce a real or negative temperature compensation point which results in attendance turnover in the temperature characteristic curve. Use of an appropriate amount of such ion or ions together with proper dilution in either or both of the iron sites may, therefore, fulfill the two fundamental requirements, i.e., magnetic moment within the designated range and a tolerable temperature dependence of this and other magnetic properties.

A preferred composition in accordance with the invention contains at least two ions in dodecahedral sites, at least one of which is selected from group (A).

A still more preferred class includes at least one of the trivalent ions of Eu, Gd, Tb or Dy; since it is such mixtures which give most desired temperature dependence for room temperature operation. Within this class a preference may exist either for gadolinium, terbium or both depending on device design. Gadolinium is the only magnetic 4*f* rare earth ion which does not have an angular orbital momentum. It is believed that it is for this reason that this ion does not have the adverse effect on domain mobility evidenced by other of the magnetic 4*f* rare earth ions. As discussed in copending application Ser. No. 30,060 Filed Apr. 20, 1970, europium and terbium are the only members of group (A) having a magnetostriction sign which is positive in the <111> direction and in consequence Eu or Tb is desirably included where magnetostriction in this easy direction is to be minimized.

Compositional ranges for the dodecahedral site are dependent on a number of factors, e.g., desired operating temperature, tolerable temperature dependence and the particular ions. Of these the third is perhaps the most significant. As a general premise the amount of magnetic rare earth ion included may be increased as one proceeds in the order of decreasing R-ion moment Gd, Tb, Dy, Ho, Eu, Er, Tm, Yb and Sm. Ce, Pr and Nd are not included in this series as they have limited solubility in the garnets. In general, for the preferred composition which includes one or more of the ions of europium, gadolinium, terbium and dysprosium, together with one or more of the ions from group (B). The range of group (A) is from 10 to 70 percent of the dodecahedral sites with elements of group (B) making up the required difference. Where other nonmagnetic ions such as $Bi^{3+}$ or $Ca^{2+}$ are included they are considered as group (B) members.

A particularly desirable compositional class of ions that occupy dodecahedral sites includes all of the ions of Eu, Gd and Tb. The dodecahedral sites may further contain nonmagnetic or weakly magnetic ions. The following table, which is exemplary only, related solely to dodecahedral site occupancy, sets forth three such compositions found desirable for device use.

TABLE 1

| | Lu or Y | Eu | Gd | Tb |
|---|---|---|---|---|
| (a) | | 0.09 | 2.325 | 0.585 |
| (b) | 1.34 | 0.16 | 1.00 | 0.50 |
| (c) | 1.85 | 0.18 | .50 | 0.47 |

Dodecahedral site occupancy has been discussed in terms largely of preferred compositions. It has been generally indicated that increasing amounts of magnetic ions may be introduced in accordance with a stated order. Assuming room temperature operation amounts of such ions may be expressed as ranging from a maximum of 70 percent of the dodecahedral sites for Gd, 80 percent for Tb and 100 T for Dy and the others. It is required that there be at least 10 percent of at least one group (A) ion. Where combinations of such magnetic ions are included, the maximum inclusion range may be determined by algebraic averaging.

3. Growth

The inventive concept is substantially independent of the growth procedure, save that growth at temperature below ≈1,200° C. is essential to ensure ordering conducive to a magnetically uniaxial alignment. (This does not preclude nucleation at higher temperature in a dropping temperature technique since the lower temperature material is matched.) Appropriate crystalline materials may be grown from the flux either spontaneously or on a seed, (see for example *J. Phys. Chem. Solids Suppl.* Crystal Growth Ed. H. S. Peiser (1967) pp. 441–444 and *Journal Applied Physics Suppl.* 33, 1362 (1962)), hydrothermally (see *J. Am. Ceram. Soc.* 45, 51 (1962)) by deposition as from the vapor by evaporation, sputtering, thermal decomposition, or zone gradient transfer, (see for example *Journal Applied Physics* 39, 4700 (1968), *Applied Physics Letters* 10, pp. 190–194 (1967) Crystal Growth, editors F. C. Frank, J. B. Mullin and H. S. Peiser, 443 (1969)).

What is claimed is:

1. Memory device comprising a body of material capable of evidencing magnetic anisotropy defining a magnetically easy direction essentially perpendicular to the plane of a body of planar configuration capable of supporting local enclosed regions of magnetic polarization opposite to that of immediately surrounding material and provided with first means for positioning such oppositely polarized local enclosed regions together with second means for propagating such regions through said body in which said material is ferrimagnetic, characterized in that the material is of the garnet structure and in that the magnetization of such material is determined by the inclusion of two types of ions in addition to Fe, the first occupying a tetrahedral site and the second occupying a dodecahedral site, said first ion being at least one ion selected from the group consisting of $Ga^{3+}$, $Al^{3+}$, $Si^{4+}$, $Ge^{4+}$ and $V^{5+}$, said first ion being present in an amount from 0.3 to 1.3 per formula unit and in which the said second ion is at least one ion selected from the group consisting of the trivalent ions of the elements of Gd, Tb, Dy, Ho, Eu, Er and Tm.

2. Device of claim 1 in which the dodecahedral site is occupied by at least one additional ion selected from the group consisting of trivalent ions of Y, La, Ce, Pr, Nd, Sm, Yb and Lu.

3. Device of claim 1 in which said second ion includes at least one ion selected from the group consisting of $Eu^{3+}$, $Gd^{3+}$, $Tb^{3+}$ and $Dy^{3+}$.

4. Device of claim 3 in which said second ion is $Eu^{3+}$.

5. Device of claim 3 in which said second ion is $Tb^{3+}$.

6. Device of claim 3 in which said second ion includes both $Gd^{3+}$ and $Tb^{3+}$.

7. Device of claim 3 in which said second ion includes $Eu^{3+}$ and at least one ion selected from the group consisting of $Dy^{3+}$, $Ho^{3+}$, $Er^{3+}$ and $Tm^{3+}$.

8. Device of claim 3 in which said second ion includes $Eu^{3+}$, $Gd^{3+}$, $Tb^{3+}$ and at least one ion selected from the group consisting of $Y^{3+}$ and $Lu^{3+}$.

9. Device of claim 3 in which said second ion is contained in amount of at least 0.3 per formula unit.

10. Device of claim 3 in which the maximum content of said first ion is 0.95.

* * * * *